United States Patent [19]
Gray

[11] 3,750,462
[45] Aug. 7, 1973

[54] ULTRASONIC VISUALIZATION IMPROVEMENT

[75] Inventor: George William Gray, Lambertville, N.J.

[73] Assignee: Hoffmann-La Roche Inc., Nutley, N.J.

[22] Filed: June 22, 1972

[21] Appl. No.: 265,129

Related U.S. Application Data

[63] Continuation-in-part of Ser. No. 73,521, Sept. 18, 1970, Pat. No. 3,718,032.

[52] U.S. Cl. .............................. 73/67.7, 340/5 MP
[51] Int. Cl. ............................................ G01n 29/04
[58] Field of Search ...................... 73/67.5 R, 67.6, 73/67.7, 67.8 S, 67.8, 67.9; 340/5 MP; 178/DIG. 18; 315/11, 12

[56] References Cited
UNITED STATES PATENTS

| | | | |
|---|---|---|---|
| 3,577,171 | 5/1971 | Turner | 73/67.5 R X |
| 3,600,936 | 8/1971 | Turner | 73/67.9 |
| 3,603,139 | 9/1971 | Ying | 73/67.9 |

Primary Examiner—Richard C. Queisser
Assistant Examiner—John P. Beauchamp
Attorney—Samuel L. Welt, Jacob Frank et al.

[57] ABSTRACT

An ultrasonic transmitting apparatus for examination of a subject in a field comprising, a CRT transmitter having a transducer excited at relatively low energy level and at a frequency which is half of the resonating frequency of the transmitting transducer to enhance receiver sensitivity. The transmitting transducer is excited in a pattern to generate corresponding successive acoustic waves to scan the subject in "flying spot" type fashion, and a receiver including a non-scan receiving transducer for electrically converting the subject reflected signals and providing a visual display.

3 Claims, 2 Drawing Figures

ULTRASONIC VISUALIZATION IMPROVEMENT

CROSS-REFERENCES TO RELATED APPLICATIONS

The present invention is a continuation-in-part of U.S. application Ser. No. 73,521, filed Sept. 18, 1970, now U.S. No. 3,718,032, for "Ultrasonic Visualization" by the applicant George William Gray.

BACKGROUND OF THE INVENTION

1. Field of the Invention

The present invention relates to techniques employing piezoelectric or other suitable materials for scanning a subject in a field with ultrasound and converting the acoustic image to electrical signals from which visual images may be found.

2. Description of the Prior Art

Existing ultrasonic image converters, based on work by Sokoloff (see U.S. Pat. No. 2,164,125) are known, which basically operate by providing a transmitting transducer to generate a continuous or pulsed pressure wave that irradiates the whole field containing an object to be examined. The ultrasonic waves which pass through the object are modulated by voids or other irregularities and are then applied to one face of a piezoelectric plate which is normally incorporated into an electron tube structure such that the voltage or charge-pattern on the inner surface of the face-plate may be "read" by a raster scanned electron beam. Although these existing visualization systems provide fair resolution at the faceplate, it has been found that such systems offer several drawbacks in that: the sensitivity is so low that extremely high and possibly unsafe levels of ultrasonic energy are required for most biological applications; no depth discrimination; and poor subject resolution is obtained so that the depth capability is limited due to signal to noise (S/N) problems.

With regard to the above, although at the present time little is known about ultrasonic toxicity, it is prudent to limit, for safety reasons, the ultrasonic power level which may be transmitted into a human subject. In utilizing safe ultrasonic power levels the tissue attenuation of ultrasound, particularly from structures deep in the body and at the higher frequencies required for good resolution, are such that the ultrasonic signal returned to the receiver will be very weak. In such prior art systems of the type described above, this returned weak signal is scanned with an electron beam which adds to the system a fraction of a volt of thermal noise, thus requiring undesirable ultrasonic power levels of the type described above to obtain satisfactory S/N ratio.

Further investigation for a suitable imaging system revealed that even an array of ultrasonic elements sequentially excited did not altogether prove to be suitable in that a small size piezoelectric transducer (i.e., 1/16 inch square) when excited, would radiate over a ninety degree (90°) angle, whereas if the same square area of a larger piezoelectric sheet were to be excited the radiation from that 1/16 inch square area would only radiate over approximately a ten degree angle. This significantly smaller beam provides for optimum transmitter power level utilization because of the availability of more practical lens configurations to focus the transmitted signal.

Problems have also been incurred in systems of the type described above whereby signals emitted or radiated from an oscillator driving the transmitting transducer, present a significant interference at the receiving piezoelectric transducer and lead line to lessen the receiver sensitivity. In effect, what occurs is hetrodyne beats are caused by the phase difference of the time delay between the transmitter-object-receiver time and the oscillator (transmitter) -receiver time, causing addition to and subtraction from ("crosstalk") the received object signal. It has been found that conventional shielding means has not been completely satisfactory in reducing this interference problem.

In addition to the above, in a recent patent to Turner, U.S. Pat. No. 3,600,936, where a CRT was used in a transceiver mode of operation, the problem of capacity in the CRT between the RF screen and piezoelectric transducer was recognized, as introducing an undesirable background or shadow noise. Of course, to obviate this problem one might readily move the RF screen back to diminish the background noise caused by the capacity coupling effect, however, this can only be accomplished at a sacrifice of system resolution due to the greater spread of secondary emission.

SUMMARY

The purpose of the present invention is to provide an ultrasonic visualization system and an electronic tube structure which allows for a micro-volt sensitivity or increase of several orders of magnitude over systems used in the prior art and which minimizes the interference problem at the incoming lead line of the receiving transducer and significantly reduces background noise caused by capacitive coupling between the screen and piezoelectric transducer. The basic operation of the system covered by the present invention uses a piezoelectric faceplate as an electronically controlled source of ultrasound to scan the subject area in a manner analogous to an optical "flying spot" scanner and most significantly at a frequency which is half that of the resonating frequency of the piezoelectric transducer.

By such an arrangement the CRT scan transmitter system may achieve good signal to noise ratio improvement by using high power density in the "flying spot" which, of course, would not be possible in the Sokoloff type systems where the transmitter irradiates the whole field continuously. In addition, utilization of a non-scanned fixed receiver transducer in the present invention as opposed to the Sokoloff type electron tube receiver, allows for a sensitivity to signals down to the low micro-volt region, limited only by amplifier input noise and not affected by hetrodyne beating.

DESCRIPTION OF THE PREFERRED EMBODIMENT

Figure 1:
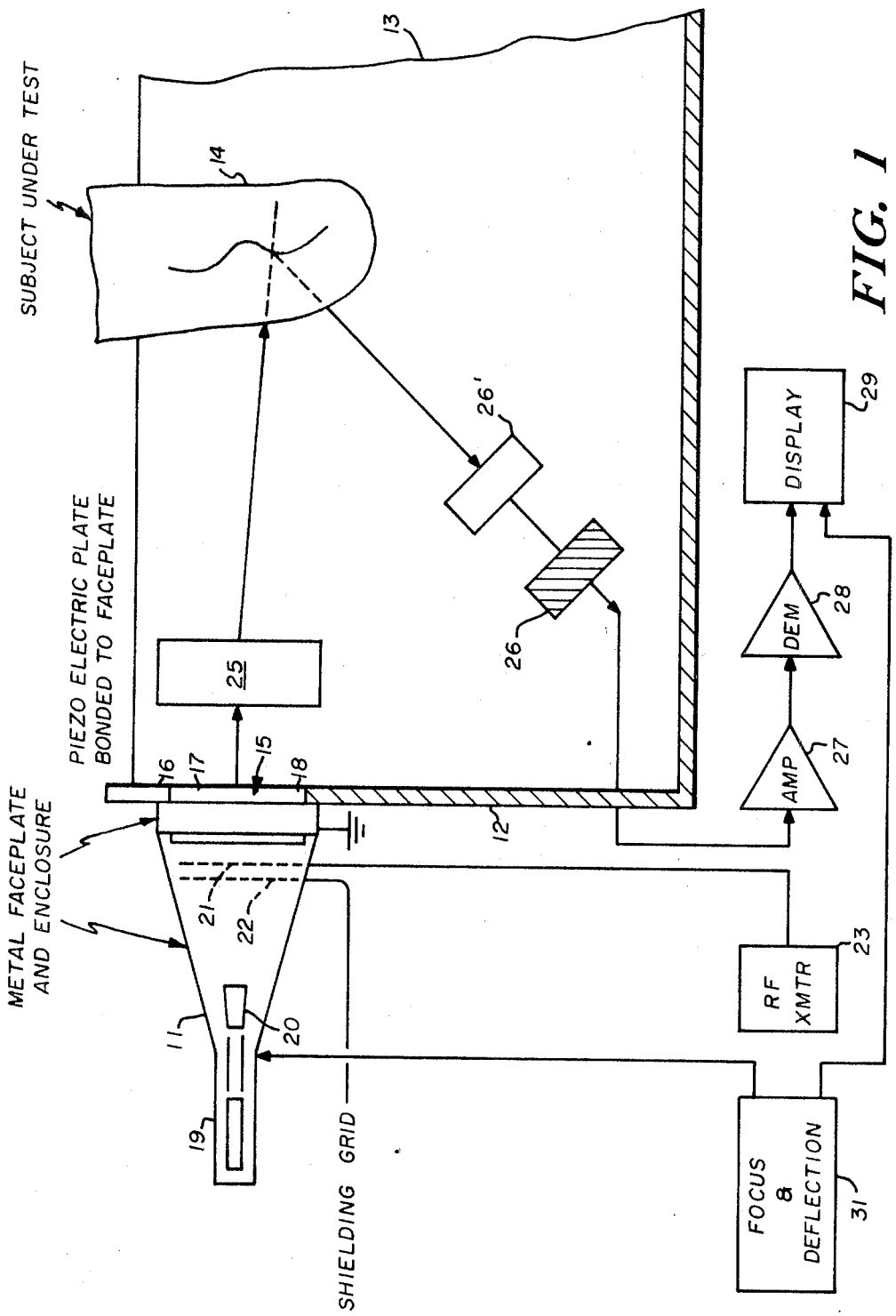
FIG. 1 is a block diagram of an illustrative overall system employing the principle of the invention.
Figure 2:
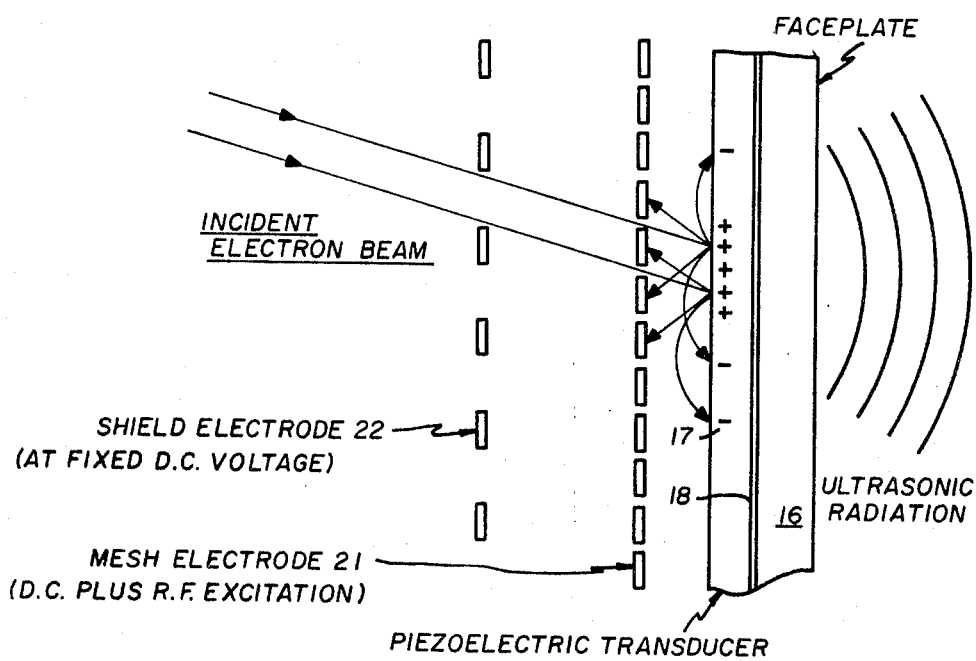
FIG. 2 is an enlarged partial view of the front end of electron tube 11 shown in FIG. 1.

Referring now to FIG. 1 of the drawings, there is shown an ultrasonic visualization system according to the invention, which includes an electron beam scanning tube 11 of the CRT type positioned against an immersion tank 12 containing an ultrasonic liquid coupling medium 13, such as water, in which the subject 14 under test, is immersed. The CRT is provided with a grounded front face 15 having contact with the coupling medium 13, and includes a support member or faceplate 16 fabricated from a suitable metallic shielding material such as brass.

The CRT is also provided with a piezoelectric transducer 17 having a metallized surface coating on one side. The transducer metallized side may be coupled to faceplate 16 by a member 18 which might comprise an adhesive that is also used in securing the piezoelectric member 17 to faceplate 16. Another coupling arrangement might include an oil with low vapor pressure for use in a vacuum as such an oil provides intimate contact with the transducer and faceplate surfaces to give uniformity. Such a latter arrangement might contemplate a mechanical coupling of the transducer to the faceplate about the transducer periphery as by an "O" ring. The CRT 11 also comprises an electron scan gun 19 and suitable deflection means 20 to deflect the electron beam from the scan gun.

Further, included in the CRT is a collector "mesh" electrode 21 positioned close to and in front of the faceplate and a second shield electrode 22 at a fixed D.C. voltage located adjacent to mesh electrode 21. Mesh electrode 21 is directly coupled for energization from a suitable wavetrain or pulse generator 23 to drive the piezoelectric transmitting transducer at a frequency half that of the resonating frequency of the transmitter transducer which has been found to provide tremendous advantages with virtually no loss of power output emitted from the transducer.

In the CRT, the incident electron beam energy is made proper to cause a relatively high secondary emission ratio. Since the piezoelectric target 17 is an insulator, its surface potential is floating and the electron illuminated portions will assume an equilibrium voltage close to that of mesh 21. With the RF voltage of half the frequency of the resonant frequency of transducer 17 applied to mesh 21, the electron-illuminated portions of the piezoelectric target will "follow" the applied voltage to excite piezoelectric generation of ultrasound.

It was found that when using the half-frequency of the resonating frequency of the piezoelectric transducer, background noise which was otherwise introduced due to capacitive coupling between the mesh screen and entire transducer, was virtually eliminated. In operation of the tube it is preferable that the potential on the backside of transducer 17 be kept fairly equal to the potential on the front surface, to improve the overall efficiency of the CRT. The second shield electrode 22 is used to prevent the alternating RF field from degrading the focus or deflection of the incident electron beam.

It has been found that if the thickness of the faceplate 16 is designated to approximately be an integral number of acoustic half-wave lengths of the RF modulation applied to grid 21, ultrasonic reflection may be kept quite low despite a large impedance mismatch between the faceplate 16 and coupling medium 13. Based upon this observation, for example, the brass support or faceplate 16 could be made a quarter inch thick with 10 half wavelengths or an eighth inch thick with five half wavelengths assuming use of 3.5 Hz operating frequency.

An ultrasonic lens 25 is mounted within the tank 12 for imaging a point on the surface of the piezoelectric faceplate to a point within the subject. Utilization of a lens system of this type allows for concentration or focus of the scanned "spot" to selected depths within the subject. Although the received ultrasonic signal will be a summation of reflections from both the organs at the focal plane and the organs at other depths in body, the effect of extraneous signals from outside the focal plane will be minimal since an out-of-focus beam will blur out the undesirable images on a display. A fixed receiving transducer 26 and lens 26' are placed at the same side of the subject as the transmitter, for focusing and receiving the subject reflected ultrasound.

Receiving transducer having a resonant frequency equal to that of the transmitting transducer 25 is electrically connected to an amplifier 27. Because of the half frequency used at pulse generator 23, the reduction of the otherwise normally received interference at the receiving transducer and lead line, allows for discerning or detection of a much clearer signal level at the receiver. This increase in sensitivity allows for visualization capabilities at deeper penetration of the subject where more attenuation is normally incurred. Amplifier 27 is then connected to amplitude demodulator 28 the video output of which is connected to a display 29 such as a kinescope unit. Display 29 and CRT 11 are each connected to a common deflection unit 31 for synchronous scanning.

In operation, the piezoelectric plate 16 is used as an electronically controlled source of ultrasonic radiation analogous to optical "flying spot" scanner, where the shape and position of the excited pattern on the faceplate is controlled by electronic focusing and deflection 31 of an electron beam pattern which is made to impinge on the inner surface of the piezoelectric target 17. This enables the electron illuminated portions to assume an equilibrium voltage close to that of the mesh 21 RF signal, to thus excite piezoelectric generation of ultrasound with a minimum of background noise which is radiated in the form of a scanned "spot" through the brass faceplate 16 and then through the liquid coupling medium 13.

The scanned "spot" is then focused or concentrated to a point at a selected depth within the subject by imaging a point on the surface of the piezoelectric faceplate with lens 25. Tissue interfaces and structures within the subject 14 then reflect ultrasonic energy, in part, back toward the piezoelectric receiver 26 which may be omnidirectional, where the received signals are converted to a low level RF electrical signal with a minimal of interference from the RF transmitter. After amplification by amplifier 27, this signal is amplitude demodulated to provide a video output which is used to intensity modulate the CRT display 29 scanned in a synchronism with the transmitting "flying spot." 10

I claim:

1. Ultrasonic apparatus for examination of a subject in a field comprising:
    CRT transmitter means having a piezoelectric faceplate resonant at a preselected frequency, for radiating successive ultrasonic energy waves adapted for scanning said field in "flying spot" fashion;
    RF excitation means for exciting said piezoelectric faceplate with a second frequency half that of the resonant frequency of the faceplate; and
    non-scan piezoelectric receiver means for providing electric signals indicative of the ultrasonic energy wave change in the field.

2. Ultrasonic apparatus according to claim 1 wherin said RF excitation means includes electrode means positioned in said CRT adjacent the inner surface of ssid piezoelectric faceplate.

3. A method for ultrasonic examination of a subject in a field which allows for receiving an improved signal-to-noise ratio at a low ultrasonic energy transmitting level comprising:

employing a CRT transmitter having a piezoelectric faceplate radiating successive ultrasonic energy waves adapted to scan the field in a "flying spot" type fashion;

exciting the piezoelectric faceplate with an RF frequency which is half that of the resonant frequency of the piezeoelectric faceplate;

sensing in a non-scanned manner an ultrasonic energy wave change resulting from the presence of the subject in the field; and, deriving electrical signals indicative of said ultrasonic energy wave change.

\* \* \* \* \*